Jan. 8, 1957 W. W. BOISTURE 2,776,727
APPARATUS FOR SEPARATING AND QUENCHING OIL PRODUCTS
Filed July 21, 1953
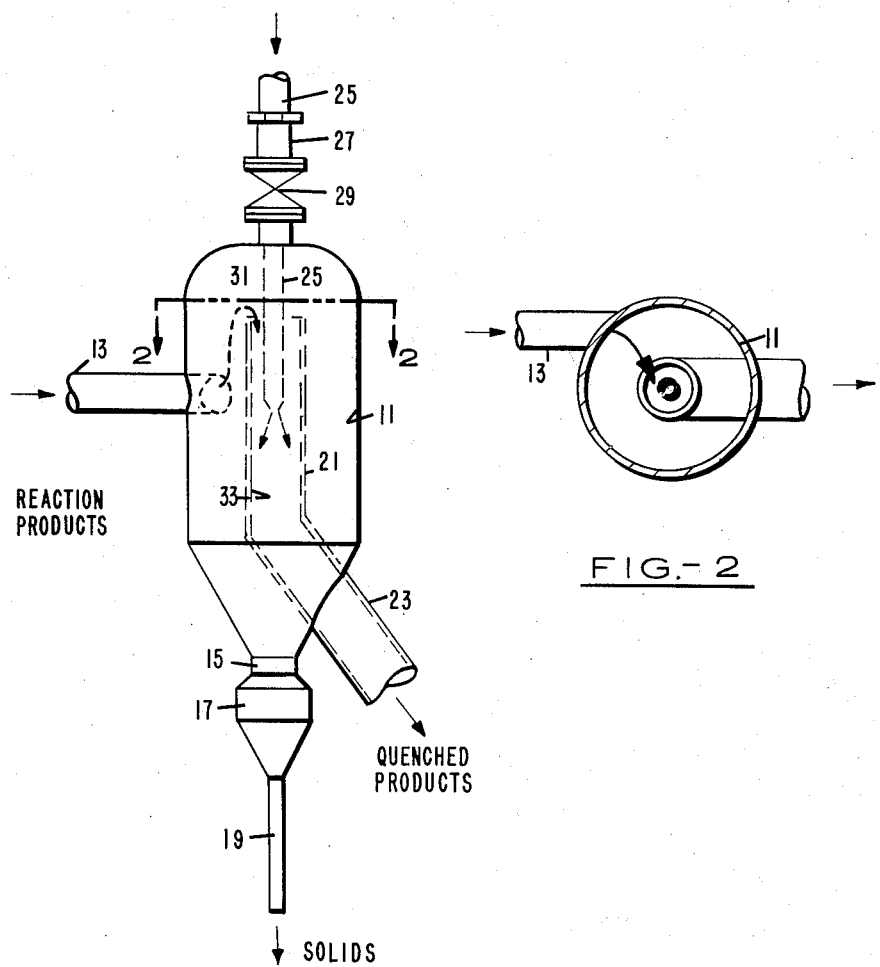
WORTH W. BOISTURE INVENTOR
BY Edwin M. Thomas ATTORNEY

2,776,727

APPARATUS FOR SEPARATING AND QUENCHING OIL PRODUCTS

Worth W. Boisture, Baton Rouge, La., assignor to Esso Research and Engineering Company, a corporation of Delaware Application July 21, 1953, Serial No. 369,451

2 Claims. (Cl. 183—82)

The present invention relates to an improved process and apparatus for separating and quenching oil products. The invention is particularly adapted for separating entrained particulate solids from a gas or vapor stream and thereafter cooling the stream of reduced solids content by quenching with a fluid, preferably a liquid, one with substantially lower temperature.

Although the invention may be applied to various uses, an important application now contemplated is to the separation and quenching of hydrocarbon oil products obtained in the conversion of heavy petroleum oils, crude oils and especially residua, and the like. For example, in certain processes where heavy hydrocarbon oils are heated to high temperatures, various products including gases like hydrogen, methane, and the like are obtained, along with liquid products which may vary from gasoline to heavy fuel oil, plus some coke. In such a process a heavy residual oil is heated to a high temperature, for example 900 to 1300° F., and the gases, liquids and solid coke produced must be separated. One conversion or coking process which is coming into use involves the so-called fluid solids technique. In such a process a mass of small particulate solids, for example particles of coke of an average diameter ranging from 40 to 400 microns, more or less, is fluidized in a vessel by passing a gas or vapor, either of which may be called a gasiform stream, upwardly through a bed of particles to cause them to become mobile and ebullient. Other particles which are inactive or substantially inactive as catalysts may be used instead of coke. By preheating the solid particles, the oil to be converted may be contacted with them and thermal cracking takes place. The oil may be vaporized or may be in liquid phase or it may be a mixture of vapor and liquid. Any liquid constituents which are present contact the hot particles and are quickly vaporized to a substantial degree. They are also substantially cracked during or after vaporization. The cracking or coking results in the formation of various fractions including normally gaseous products, liquid hydrocarbons of lower boiling range than that of the original feed, some heavy liquid and some coke which is deposited upon the hot particles.

In the process described above part of the oil products are vaporized as well as being cracked by the heat. It has been found that they should be cooled quickly or further cracking and/or condensation and polymerization reactions of undesirable types take place. In prior processes of this type the reaction products usually are carried out of the reaction zone via a separating device or apparatus which separates entrained particles from the gasiform stream. Such a separator, usually in the form of a cyclone, is interposed between the reaction zone and a quenching zone where the products are cooled to a desirable temperature. If cooling is not accomplished quickly, some of the cracked products, especially those that are unsaturated, tend to polymerize, condense, reform, etc. and form viscous materials which adhere to walls, conduits, and other apparatus elements causing obstruction and faulty operation. Hence, it would be desirable to quench the products immediately after the solids have been removed from the gasiform stream, without waiting for the time normally required to pass them through a conventional cyclone type separator.

Accordingly, it is an object of the present invention to make it possible to quench reaction products quickly in connection with the operation of passing them through a cyclone or equivalent. This is preferably accomplished immediately after the particulate solids are removed so as to avoid cooling the solid particles by the quenching operation.

Other objects of the invention will appear as this description proceeds. It will be understood that the following description of a preferred modification is illustrative but the invention is not limited to the specific embodiment disclosed. Reference, therefore, will next be made to the attached drawing, wherein Fig. 1 shows a diagrammatic view in elevation of a system or apparatus embodying the invention. Fig. 2 is a horizontal cross-sectional view taken substantially along the line 2—2 of Fig. 1, looking downwardly.

Referring now to the drawing, Fig. 1 shows a device for separating solid particles from a stream of gasiform material such as hydrocarbon vapors in which particles are entrained. This apparatus is shown as comprising a cyclone body 11 of more or less conventional form which is circular in cross section and has a substantially vertical axis. The stream of material to be treated, designated "Reaction Products" in Fig. 1, enters more or less tangentially, in conventional manner, through a conduit 13. The velocity of the entering stream separates the particles from the stream by centrifugal force so that they may pass down inside the outer wall of the cyclone and through a conduit 15, a secondary separator 17, and a dip-leg or the like, all of conventional type.

In most conventional cyclones, the gases or vapors separated from entrained solids are taken out overhead. In the present case, however, an internal annular conduit 21 is mounted with its axis, or the axis of an upper part thereof, substantially coinciding with the vertical axis of the cyclone body 11. The lower part of conduit 21 is deflected as indicated at 23 to carry the stream of reduced solids content outside of the cyclone.

A conduit 25, of smaller diameter than conduit 21, is located so that its lower end extends within the upper part of conduit 21. Through this smaller conduit a quenching fluid of any suitable type may be introduced. The conduit is preferably mounted within a conventional packing gland and valve indicated in 27 and 29 so that the tube 25 may be projected into conduit 21 to a variable distance or may be withdrawn altogether by loosening the packing gland 27, the valve 29 being provided to close the opening when tube 25 is completely withdrawn.

It will be understood that a stream of vapor or gas, or both, enters the cyclone through line 13 and the solid particles entrained therein are separated. The stream passes into the annular opening between conduits 21 and 25 as indicated by the arrow 31. A suitable quenching fluid is introduced through conduit 25 in sufficient quantities and at a sufficiently low temperature to quickly reduce the temperature of the gasiform stream below the range where polymerization or other degradation takes place. For example, assuming a stream of reaction products enter the cyclone 11 at a temperature of 1000° F. it may be desirable to reduce the temperature to 800° F. or lower as quickly as possible. A quantity of quenching fluid, for example a liquid hydrocarbon of appropriate boiling range such as a residuum or a heavy gas oil or other suitable fraction is introduced through the line 25 at such a rate that the stream entering at arrow 31 is quickly cooled well below 800°

F. Where a residuum is being coked, for example, part of the feed may be used for quenching, at least in many cases.

It will be noted that quenching does not take place before the solid particles are separated but it does take place very quickly thereafter without waiting for the products to be taken completely out of the separator or cyclone. The quenching of the products involves relatively little heat loss whereas cooling of the solids too, which would necessitate subsequent reheating, would involve very considerable heat losses.

In order to improve quenching efficiency, it is desirable to prevent substantial heat exchange between the gases and solids outside conduit 21 and the quenched products in line 21 below the outlet of conduit 25. This may be provided by insulating the tube 21 in some manner. A simple form of insulating is to make the conduit 21, 23 a double walled tube with a space between the two walls to cut down heat transfer. With this construction the quenched products inside conduit 21, 23 are not appreciable affected by the high ambient temperatures of the solids, etc., surrounding the conduit.

It will be understood that the reaction products entering the cyclone may come in at various temperatures and may be quenched to various temperatures which are substantially lower, depending upon the type of materials involved and the kind of quenching required. In coking residual oils, for example, the reaction products may leave the coking bed at a temperature of 800 to 1300° F. or even up to 1500° F. in some cases, and it may be desirable to quench them by cooling quickly as much as several hundred degrees F. In other cases the degree of quenching may be much less. In any case the apparatus and process of this invention may be utilized by selecting an appropriate quenching agent and feeding it at a suitable rate to accomplish the necessary quenching. By raising or lowering the conduit 25 within conduit 21 the time of quenching may be varied as desired. The quenching fluid, usually a high boiling liquid, though a lower boiling liquid, and in some cases even a vapor or gas may be used, may be sprayed into the descending stream of products, the lower end of the conduit 25 being preferably formed as a spray nozzle. As a specific example, a partly preheated residuum, of the same stock as fed to the coker, may be used as the quenching medium. This may be preheated to any appropriate temperature, up to about 750° F. Preferred temperature of the quenching medium for most purposes is between about 500 to 700° F.

It will be understood that various modifications may be made without departing from the spirit of the invention.

What is claimed is:

1. A solids-gas separator of the cyclonic type comprising, in combination, a vertically disposed circular vessel, an inlet conduit for horizontally and tangentially admitting a solids-gas suspension into an intermediate portion of said circular vessel, outlet conduit means in the bottom end portion of said circular vessel for removing separated solids therefrom, insulated withdrawal conduit means internally and axially disposed of said vessel terminating in spaced relation to the upper end portion of said circular vessel substantially above the point of junction of said inlet conduit with said circular vessel adapted to the withdrawal of separated gases therefrom, and detachably mounted conduit means extending through the upper end portion of said circular vessel and terminating within said withdrawal conduit means adapted to discharge a quench fluid therein.

2. Apparatus for separating finely divided solid particles from a high temperature oil vapor containing stream which comprises, in combination, a cyclone having a substantially vertical axis, a tangential inlet for said stream, an axially mounted outlet conduit extending above the horizontal plane of said tangential inlet and upwardly opening and terminating in spaced relation to the upper end wall of said cyclone, said outlet conduit receiving said stream after solid particles are substantially removed therefrom, said outlet conduit extending and leading laterally downward outside said cyclone, a withdrawal conduit in the lower end portion of said cyclone adapted to remove separated finely divided solid particles therefrom, and a conduit extending through said upper end wall and terminating within said outlet conduit adapted to inject a quenching fluid into said outlet conduit.

References Cited in the file of this patent

UNITED STATES PATENTS

| | | |
|---|---|---|
| 1,212,596 | Williams | Jan. 16, 1917 |
| 2,059,522 | Hawley | Nov. 3, 1936 |
| 2,356,697 | Rial | Aug. 22, 1944 |
| 2,405,395 | Bahlke et al. | Aug. 6, 1946 |
| 2,422,501 | Roetheli | June 17, 1947 |
| 2,485,315 | Rex et al. | Oct. 18, 1949 |
| 2,698,281 | Leffer | Dec. 28, 1954 |
| 2,698,672 | Burnside et al. | Jan. 4, 1955 |